April 29, 1930.    R. J. HAUG    1,756,120
VISCOSITY MEASURING DEVICE
Filed Oct. 26, 1925    2 Sheets-Sheet 1

Inventor:
Richard J. Haug

April 29, 1930.    R. J. HAUG    1,756,120
VISCOSITY MEASURING DEVICE
Filed Oct. 26, 1925    2 Sheets-Sheet 2

Inventor,
Richard J. Haug
by
atty

Patented Apr. 29, 1930

1,756,120

UNITED STATES PATENT OFFICE

RICHARD J. HAUG, OF NASHUA, NEW HAMPSHIRE

VISCOSITY-MEASURING DEVICE

Application filed October 26, 1925. Serial No. 64,778.

This invention relates to devices for determining the viscosity of fluids and has particular reference to a device for providing a continuous indication of the viscosity of the circulating lubricating oil in an automobile engine, although not necessarily restricted to such use.

The degree of viscosity of a lubricating oil is largely a measure of the lubricating ability of the oil. When the oil has a relatively high viscosity, the lubricating ability of the oil is usually good; when the viscosity is relatively low, the lubricating ability is poor. An oil of poor lubricating ability and, consequently, low viscosity, is relatively thin and fluid as compared with an oil of good lubricating ability and relatively high viscosity. A lubricating oil usually deteriorates with use and ultimately arrives at a point where its viscosity is so low that the oil should be replaced by a fresh lubricant, as otherwise the bearing surfaces may come into contact and become rapidly worn or damaged. The deterioration of the oil in an automobile engine is hastened by the heat of the engine parts, which "cracks" or breaks down the oil into more simple chemical compounds, and by dilution with the engine fuel, and by condensed water vapor, all of which lower the viscosity of the lubricant. It is common practice to change the oil in automobile engines at periodic intervals determined by experience. While it is desirable to change the oil when the viscosity thereof has been dangerously impaired, it is needless to change the oil prior to that time. An over cautions driver may change the oil much more often than is necessary and thereby incur needless expense.

An object of this invention is the provision of means arranged to warn the driver of an automobile when the lubricating ability of the engine oil is dangerously impaired.

A further object is the provision of means to give a continuous indication of the lubricating ability of the engine oil, so long as the engine is running.

A yet further object is the provision of a viscosity measuring device which is actuated by the power of the fluid flowing through it to indicate changes in viscosity thereof.

A further object is generally to improve the construction and operation of viscosity measuring and indicating devices.

Figure 1:
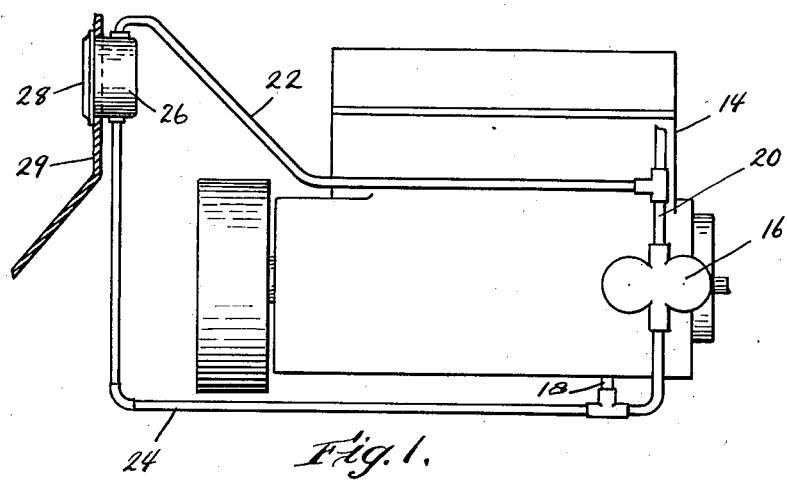
Fig. 1 is a diagrammatic representation of the lubricating system of an automobile engine with which a viscosity indicator embodying my invention is associated.

The invention illustrated in Fig. 1 is applied to an automobile engine 14 having a pressure feed oil pump 16 which receives the oil from the crank case through a pipe 18 and circulates it under pressure to the various parts of the engine through a pipe 20. The oil pump is usually provided with a pressure regulator, not shown, which serves to maintain a constant oil pressure in the pressure pipe 20, regardless of the speed of the engine above a low, or idling, speed.

The viscosity measuring device embodying my invention is adapted to receive a portion of the oil circulated under pressure through the pipe 22 which is connected with the pressure pipe 20. The oil, after it has passed through the measuring device, is returned to the suction side of the pump or to the crank case through the return pipe 24.

The viscosity measuring device embodying the invention is contained within a cylindrical enclosing casing 26 which has the removable front wall 28. Said casing is adapted to be secured to the cowl 29 of the automobile or in some other convenient location wherein the indications thereof may be observed readily by the driver of the automobile. The viscosity indicator includes a reservoir 30 which is disposed in the upper part of the casing. Said reservoir may be of any suitable shape and dimensions and may include a plate 32 which forms the bottom wall of the reservoir. The ends of the plate may be reflexed upwardly and inwardly toward each other to form the side walls of the reservoir. A segmental-shaped plate 34 is secured to a side edge of the plate 32 to form the rear wall of the reservoir and a similar plate 36 may be secured to the opposite edge of said plate 32 to form the front wall of the reservoir. Said front plate 36 is provided with a depending ear 38 which forms one of the pivotal supports for the movable parts of the indicator.

Said reservoir 30 is adapted continuously to be supplied with lubricating oil, when the engine is running, by means of a nozzle 39 which is connected to the pipe 22. Said nozzle 39 is disposed above said reservoir and is adapted to discharge oil therein. Excess oil is adapted to overflow from said reservoir into an overflow pipe 40. Said pipe is more or less rectangular in cross section and has a relatively large entrance into which the oil in said reservoir is adapted to pass. Said pipe 40 extends from the upper portion of said reservoir downwardly through the plate 32 and into a lower reservoir 42 which reservoir is of more or less semi-circular shape. Said reservoir 42 is adapted to overflow into the bottom of the casing 26 and to escape through the pipe 24, and thence to return to the engine.

Said upper reservoir 30 is provided with a nozzle 44 disposed in the bottom thereof and below the entrance of said overflow pipe. Oil is adapted continuously to flow from said orifice of said nozzle and onto a viscosity indicating device. The arrangement of the nozzle and overflow pipe is such that a constant head of oil is maintained in the reservoir above the nozzle. The oil pump 16 is adapted to pump into the reservoir at all times when it is running at least as much oil as flows through said orifice, whereby to maintain a constant head above the nozzle in the reservoir and any excess oil is adapted to escape from the reservoir through the overflow pipe 40. The flow of oil through the orifice under such constant head is governed largely by the viscosity of the oil. If the oil is quite viscous, the rate of flow is relatively slow and consequently but a relatively small amount of oil will flow through the orifice in a given time. However, if the oil has but little viscosity, it will flow at a faster rate through the orifice and consequently a greater quantity of oil will be discharged in the same given time.

The viscosity indicating means associated with the reservoir and nozzle comprises essesentially means to measure the rate of flow of the oil which passes through the orifice. The indicating means comprises perferably a hydraulic motor. As here shown, the hydraulic motor includes a plate shaped to provide a U-shaped trough 46 which has upturned and parallel side walls 47 and a straight bottom wall 48. Said trough is pivotally supported horizontally to vibrate in a vertical plane by trunnions 50 which are fixed to the side walls of the trough in the middle thereof, and above the bottom wall, and extend outwardly in opposite directions and in axial alignment. Said trunnions are journalled loosely in tubular bushings 52, one of which is fixed in the overflow pipe 40 and the other of which is fixed in the depending ear 38 of the upper reservoir. Said bushings 52 are also journalled loosely in the front and rear walls of the enclosing casing, so that the reservoirs are pivotally supported in the casing for a purpose hereinafter to be set forth. The arrangement is such that the horizontal pivotal supporting line for the trough is disposed in the vertical line of the orifice 44. A guide plate or lips 54 is disposed approximately vertically within said trough transversely thereof and in line with the pivotal axis of the trough and also in line with the flow of oil from the orifice. As the trough vibrates or reciprocates, said plate is adapt- to guide the oil to flow onto the trough first on one and then on the other side of the plate. When the oil stream flows mainly on the left hand side of the trough, say, the impact force of the moving oil stream, and the weight of the oil on that side of the trough, serves to overbalance the trough, whereby to tilt it, or cause it to move in a counter-clockwise direction. Such movement, when sufficiently extensive, serves to move the upper edge of the guide plate to the left across the oil stream, whereby to divert the stream from the left to the right-hand side of the trough. The trough is now overbalanced on the right-hand side and so caused to tilt in the opposite, or clockwise direction, and the oil stream is again diverted back to the left-hand side of the trough. The trough is thus caused to maintain a vibratory movement for so long as oil flows from the nozzle. The trough empties into the lower reservoir. The rapidity of the reciprocatory movement of the trough and the extent of amplitude of such movement is governed largely by the viscosity of the oil. When the oil is relatively viscous, it flows relatively slowly from the nozzle, and escapes relatively slowly from the trough. Consequently, the rate of reciprocatory movement of the trough is relatively slow and its amplitude is relatively small. When, however, the oil has but little viscosity, it flows from the trough at a considerably faster rate. The reciprocatory movement of the trough is then relatively rapid and its amplitude is increased.

Means are provided to indicate to an observer the amplitude and rapidity of vibratory movement of the trough whereby to indicate, in a comparative manner, the viscosity of the oil. The indicating means includes a weighted pendulum-arm 56 which is secured to the forward trunnion 50 of the trough and extends therebelow and is disposed in front of the lower reservoir 42. Said arm is arranged to govern the vibratory movement of the trough and to render the movement more uniform, as well as to function as an indicator. The front cover plate 28 of the enclosing casing is provided with an opening or a transparent window 58 which is disposed in line with the lower end of the pendulum-arm 56 and through which the movements of the arm may be observed.

The movements of the automobile and, especially, the lateral movements, are found sometimes to effect the indication of the arm and to give momentarily an incorrect idea of the viscosity of the oil. To compensate for such movement, the upper and lower reservoirs are pivotally supported by the bushings 52 in the enclosing casing. The lower reservoir is adapted to be larger, and therefor heavier, than the upper reservoir and, since it is below the line of pivotal support, serves to maintain both reservoirs and associated mechanism in vertical position, regardless of lateral movements of the automobile. Means are also provided to compensate for errors in reading, due to a displacement of the apparatus within the casing. Said means comprises essentially a compensating dial comprising a flat plate 60 of segmental shape. Said plate 60 is provided at its upper end with a hub 62 which is journalled loosely on the front bushing 52. The weight of said plate 60 serves to maintain it always in a vertical position regardless of lateral movements of the automobile. Said plate is provided with two apertures or windows 64 which are disposed on opposite sides of the center line of gravity of the plate and in line with the pendulum-arm 56 and window 58 of the enclosing casing.

When the oil is relatively viscous, the amplitude of oscillation of the trough, and the pendulum-arm, is designed to be so small that the pendulum does not swing sufficiently to be observed through either of said windows 64. An observer is therefore assured that the viscosity of the oil is satisfactory. When, however, the oil becomes less viscous, the amplitude of oscillation of the pendulum becomes increased and, upon a sufficient lowering of the viscosity, the pendulum may be observed to vibrate in and out of sight through the windows 64. The appearance of the pendulum is therefore an indication that the viscosity of the oil is impaired and that the oil should be replenished. The exposed face of the pendulum-arm may be colored or otherwise treated to render it readily discernible.

The temperature of the oil has some effect upon its viscosity. Ordinarily, the oil is less viscous when hot than when cold. As ordinarily used, however, the change of viscosity of the oil due to temperature variations is not sufficient to impair to any material degree the indications of the device. The temperature of the oil may be compensated for, however, by the provision of means automatically to decrease the area of said orifice 44 in some degree proportionally to the increase in temperature of the oil.

Figures 6, 10, 11:
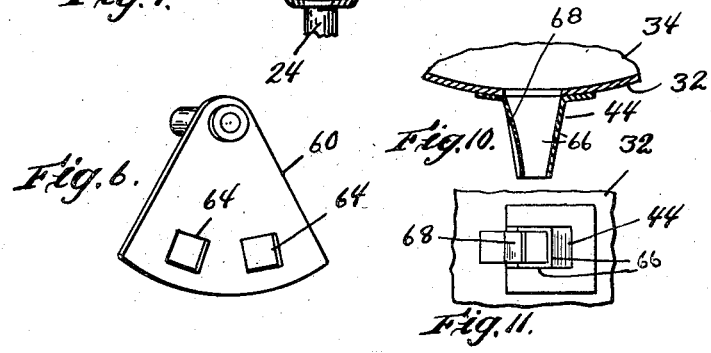
Fig. 6 is a perspective view of the compensating dial illustrated in Figs. 3 and 4.
Fig. 10 is a sectional detail of a temperature-compensating orifice.
Fig. 11 is an elevation, looking up, of Fig. 10.

In Figs. 10 and 11, a nozzle is shown which comprises essentially a U-shaped plate 66. A strip of thermostatic metal 68 is disposed between the opposite legs of said plate and forms a wall of the nozzle. Said thermostatic strip is composed of two materials having dissimilar expansion co-efficients and are welded or otherwise secured rigidly together. The dissimilar metals, for instance, may comprise copper and iron. Preferably the thermostatic strip is so arranged that the metal having the greatest expansion co-efficient is on the outside. As thus arranged, when the oil becomes elevated in temperature and becomes more fluid, the thermostatic strip becomes heated and extends inwardly and thereby reduces the area of the orifice.

Figure 7:
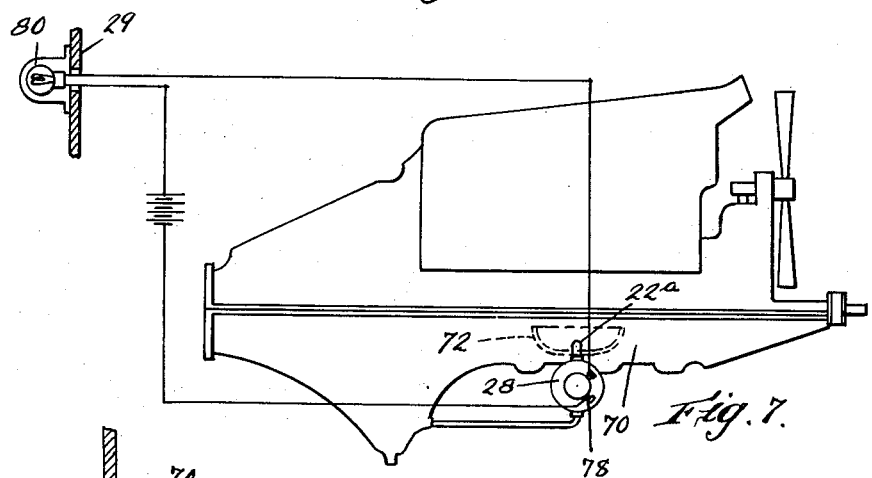
Fig. 7 is a view similar to Fig. 1 but illustrating the invention applied to an engine utilizing splash lubrication.
Figures 8, 9:
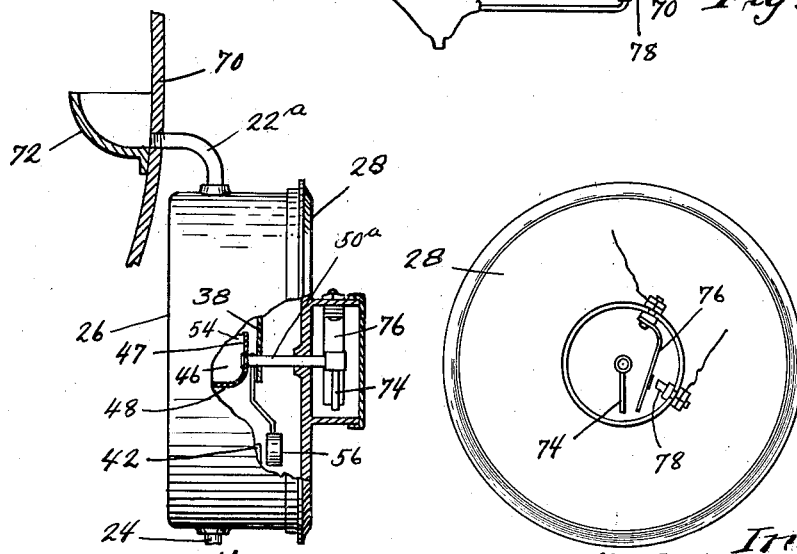
Fig. 8 is a detailed side elevation, partly in section, of the viscosity indicator of Fig. 7.
Fig. 9 is a front view of the indicator of Fig. 8 with a cover removed to expose the electrical contact members.
Figure 2:
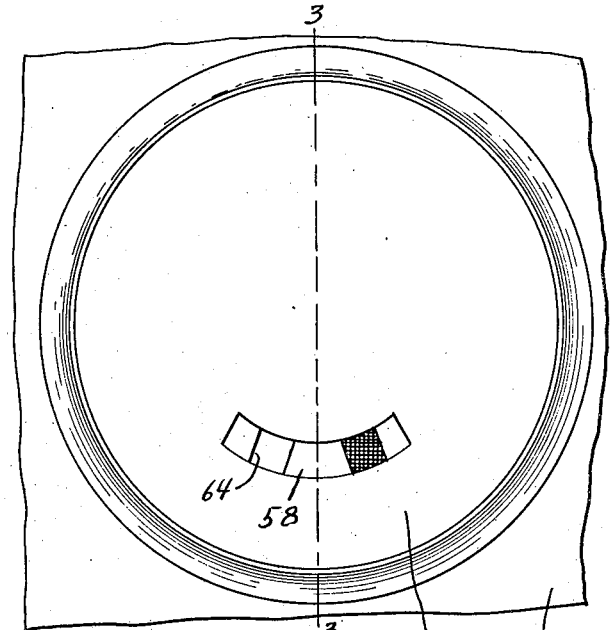
Fig. 2 is a front elevation of a viscosity indicator embodying my invention.
Figure 3:
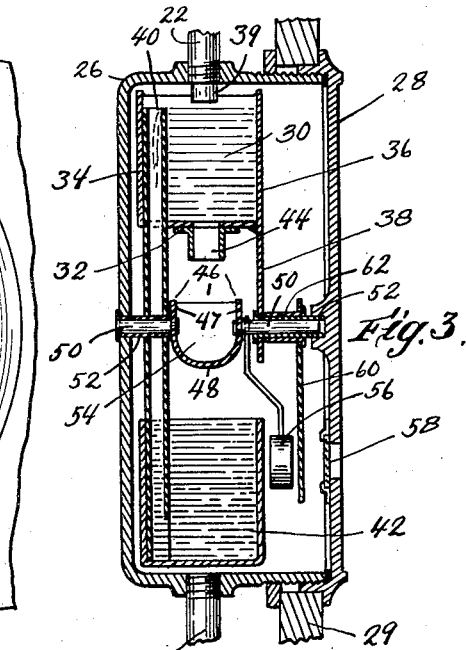
Fig. 3 is a sectional elevation taken along line 3—3 of Fig. 2.
Figure 4:
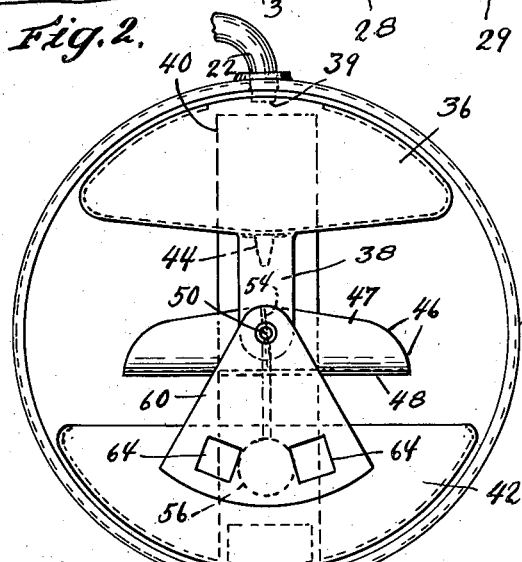
Fig. 4 is a front elevation of the mechanism of Fig. 3, with the front casing removed.
Figure 5:
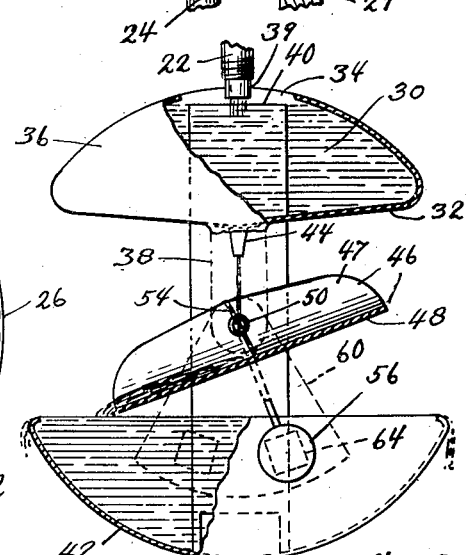
Fig. 5 is a view similar to Fig. 4 but with some of the parts shown in section.

When the invention is applied to an automobile engine provided with splash lubrication, it is not practical to place the viscosity measuring device directly upon the cowl of the automobile. Under such circumstances, I prefer to locate the measuring device at the crank case 70 of the engine as illustrated in Figs. 7 and 8. As thus arranged, the crank case is provided internally with a bowl 72 which is disposed in position to receive the splash of oil within the crank case. Oil collects in the bowl and flows into the measuring device through a pipe 22$^a$. One of the trunnions for the trough, as the trunnion 50$^a$, is extended through the front wall of the enclosing casing and is provided with an arm 74. A movable contact member 76 is disposed in the path of movement of said arm 74 and is adapted to cooperate with a fixed contact member 78 to control an electric circuit which includes an electric light 80 which light may be disposed on the cowl of the automobile. The arrangement of said arm 74 and contact members is such that, when the oil is sufficiently viscous, the amplitude of oscillation of said arm 74 is so small that it does not cause the engagement of said contact members. When, however, the oil becomes less viscous, an increased amplitude of oscillation is imparted to said arm 74 and it thereby intermittently moves said contact arm 76 into engagement with the stationary contact arm 78. The electric light 80 is thus intermittently illuminated or flashed; and the flashing of the light is indicative of the impoverished viscosity of the oil.

The construction may be otherwise modified without departing from the scope of the invention.

I claim:

1. The method of measuring the viscosity of a liquid by the use of a hydraulic motor having a movable element, which method consists in discharging a stream of the liquid under constant pressure, upon the movable element of the motor and thereby displacing the movable element thereof, and observing the extent of such displacement.

2. The method of measuring the viscosity of a liquid by the use of a hydraulic motor having a movable element, which method consists in discharging a stream of the liquid under constant pressure through a passage of predetermined dimensions upon the movable element and thereby displacing it, and measuring the extent of such displacement.

3. The method of measuring the viscosity of a liquid by the use of a hydraulic motor having a movable element, which method consists in discharging a stream of the liquid through a passage of predetermined dimensions upon the movable element and thereby displacing it, maintaining a constant head of the liquid above said passage, and measuring the displacement of the movable element.

4. The combination of a viscosity measuring device having a movable indicating member acted upon by a moving stream of the liquid to indicate the viscosity thereof, and means to supply liquid under constant head and at a velocity which varies with its viscosity continuously to said movable member, whereby to actuate it.

5. The combination with an automobile engine and its oil circulatory system, of an oil-viscosity measuring device having a movable measuring member acted upon by the oil, and means associated with the oil circulatory system to supply said movable measuring member with circulatory oil and also to circulate oil through the system.

6. A viscosity measuring device including means to provide a flow of fluid which varies in accordance with variations in viscosity of the fluid, and means to measure the variable fluid flow including a displaceable member disposed in the path of the fluid and impinged upon by the fluid.

7. A viscosity measuring device including means to provide a flow of fluid which varies in accordance with variations in viscosity of the fluid, and a power translating device acted upon by and responsive to the variable fluid flow.

8. A viscosity measuring device including means to provide a flow of fluid which varies in accordance with variations in viscosity of the fluid, and a hydraulic motor acted upon by and responsive to such variable fluid flow.

9. A viscosity measuring device including means to provide a flow of fluid under constant head, which flow is adapted to vary in accordance with variations in the viscosity thereof, and a power-translating device acted upon by and responsive to such variable fluid flow.

10. A viscosity measuring device including a reservoir having a discharge orifice, an overflow passage disposed above said orifice, means to supply fluid to said reservoir in quantities sufficient to overflow said reservoir, and a hydraulic motor disposed in position to be directly acted upon by the fluid passing through said orifice.

11. A viscosity measuring device including a reservoir having a discharge orifice in the bottom portion thereof, an overflow passage in the upper portion thereof, a fluid inlet to said reservoir, and a hydraulic motor disposed beneath said orifice in position to be directly acted upon by the fluid passing from said orifice.

12. A viscosity measuring device including a reservoir having a discharge orifice in the bottom portion thereof, an overflow passage in the upper portion thereof, a fluid inlet to said reservoir, and a hydraulic motor disposed beneath said orifice in position to be directly acted upon by the fluid passing from said orifice, said motor having a visual viscosity indicator associated therewith.

13. A viscosity measuring device including a reservoir having a discharge orifice in the bottom portion thereof, an overflow passage in the upper portion thereof, means to supply fluid to said reservoir in quantities sufficient to overflow said reservoir, a hydraulic motor disposed beneath said orifice in position to be operated by the fluid passing from said orifice having a fluid-actuated element which is displaced in proportion to the viscosity of the fluid, and a visual viscosity indicator actuated by the fluid actuated elements of said motor.

14. A viscosity measuring device including an upper reservoir having a discharge orifice and an overflow passage, the entrance of which is above said orifice, a discharge reservoir disposed beneath said upper reservoir and said orifice and overflow passage, and a viscosity measuring hydraulic motor disposed between said reservoirs and in position to be directly acted upon and operated by the fluid passage through said orifice.

15. A viscosity measuring device including a hydraulic motor having a movable member the movement of which is variable in accordance with variations of viscosity of the fluid actuating it, means to indicate such variations of movement, and means to supply said movable member with fluid.

16. A viscosity measuring device including a hydraulic motor having a movable member the movement of which is variable in accordance with variations of viscosity of the fluid actuating it, means to indicate such variations of movement, and means to supply said movable member with fluid under constant head.

17. A viscosity measuring device for fluids including a vibratory member the amplitude of vibration of which is responsive to variations in viscosity of the fluid, and a cover plate which normally conceals said vibratory member, said cover plate having a window therein disposed in position to expose said vibratory member only in an abnormal position thereof.

18. A viscosity measuring device for fluids including a pendulous vibratory member the amplitude of vibration of which is responsive to variations in viscosity of the fluid, and a pendulous cover plate disposed in position normally to conceal said member, said cover plate having a window therein disposed in position to expose said vibratory member in an abnormal position thereof.

19. A viscosity measuring device for fluids including a pendulous vibratory member the amplitude of vibration of which is responsive to variations in viscosity of the fluid, and means to indicate an abnormal amplitude of vibration of said member including gravity influenced means automatically to compensate for a variable inclination of the measuring device.

20. A viscosity measuring device for fluids including a plate pivotally supported at its middle, and means to direct a stream of fluid onto said plate alternately on opposite sides of its pivotal support, whereby to cause said plate to vibrate, said plate characterized by vibrating with an amplitude which varies with the viscosity of the fluid, and means admitting observation of the amplitude of vibration of said plate.

21. A viscosity measuring device for fluids including a horizontal plate pivoted horizontally in its middle, means providing an orifice disposed above said plate and the pivot line, said plate having an upstanding lip disposed beneath said orifice and arranged to guide a fluid stream to pass from said nozzle onto said plate alternately on opposite sides of said lip, whereby to vibrate said plate, said plate characterized by vibrating with an amplitude which varies with the viscosity of the fluid, and means admitting observation of the amplitude of such vibration.

22. A viscosity measuring device for fluids including a reservoir having an orifice in the lower portion thereof and an outlet passage having its entrance disposed above said orifice, a horizontal plate disposed beneath said orifice and pivoted horizontally in its middle, the pivot-line lying beneath said nozzle, a lip upstanding from said plate at its pivot-line and disposed beneath said nozzle in position to direct a fluid stream to flow from said nozzle onto said plate alternately on opposite sides of said lip, whereby to vibrate said plate, said plate characterized by vibrating with an amplitude which varies with the viscosity of the fluid, and means admitting observation of the amplitude of such vibrations.

23. A viscosity measuring device for fluids including a reservoir having an orifice in the lower portion thereof and an outlet passage having its entrance disposed above said orifice, a horizontal plate disposed beneath said orifice and pivoted horizontally in its middle, the pivot-line lying beneath said nozzle, a lip upstanding from said plate at its pivot-line and disposed beneath said nozzle in position to direct a fluid stream to flow from said nozzle onto said plate alternately on opposite sides of said lip, whereby to vibrate said plate, a pendulum-arm fixed to said plate and depending therebelow, whereby to vibrate with said plate, said plate characterized by vibrating with an amplitude which varies with the viscosity of the fluid, and means admitting of observation of the amplitude of vibration of said arm.

24. A viscosity measuring device for fluids including a reservoir having an orifice in the lower portion thereof and an outlet passage having its entrance disposed above said orifice, a horizontal plate disposed beneath said orifice and pivoted horizontally in its middle, the pivot-line lying beneath said nozzle, a lip upstanding from said plate at its pivot-line and disposed beneath said nozzle in line with the flow of fluid from said orifice to direct a fluid stream to flow from said nozzle onto said plate alternately on opposite sides of said lip, whereby to vibrate said plate, said plate characterized by vibrating with an amplitude which varies with the viscosity of the fluid, said lip having an inclination to the line of fluid flow, and means admitting of observation of the amplitude of vibration of said plate.

25. A viscosity measuring device for fluids including a reservoir having an orifice in the lower portion thereof and an outlet passage having its entrance disposed above said orifice, an open-ended trough disposed beneath said orifice and extended approximately equally on opposite sides thereof, means pivotally engaging the opposite side walls of said trough at the middle and above the bottom thereof, whereby to support said trough for vibratory movement, said trough characterized by vibrating with an amplitude which varies with the viscosity of the fluid, a plate disposed vertically within said trough in the pivot-line thereof and in position to swing alternately on opposite sides of the fluid stream passing from said orifice, a reservoir disposed below said trough in position to receive fluid escaping from the opposite ends thereof, a pendulum-arm carried by said trough, and means admitting of observation of the vibration of said pendulum-arm.

26. The combination with the oil-circulatory system of an automobile engine, of means supplied by said circulatory system providing a constant head of oil, and a single movable element providing both an indication of the circulation of the oil and also of the viscosity thereof.

27. A viscosity measuring device including a casing having a fluid-inlet passage in the upper portion thereof, and a fluid-outlet passage in the lower portion thereof, and a hydraulic motor disposed within said casing between said passages, said motor having means operated by the fluid passing between said passages to measure the viscosity of the fluid.

28. In a viscosity measuring device means to indicate the viscosity of a fluid, and means responsive to the temperature of the fluid to influence the indication of the device.

29. A viscosity measuring device having means including an orifice through which a fluid is adapted to pass in measuring its viscosity and means responsive to the temperature of the fluid to govern the dimensions of said orifice.

30. A viscosity measuring device having a movable member responsive to variations in viscosity of a fluid, said member having a surface from which the fluid is adapted freely to run, and which is also characterized by retaining an amount of fluid which varies in accordance with the viscosity of the fluid, whereby to vary the weight of fluid on said surface and consequently to displace said movable member accordingly, a support for said movable member and means to apply fluid to said surface of said movable member.

31. A device for measuring the viscosity of a fluid including means to discharge a jet of the fluid under constant head, and a member acted upon by said jet having means to cause it to vibrate under the action of said jet, said vibratory member having opposed surfaces alternately over which the fluid is adapted to flow at a rate dependent upon the viscosity of the fluid whereby to change the character of the vibration of said vibratory member in accordance with changes of viscosity of the fluid.

32. A device for measuring the viscosity of a fluid including means to discharge a jet of the fluid under constant head, and a member acted upon by said jet having means to cause it to vibrate under the action of said jet, said vibratory member having opposed surfaces alternately over which the fluid is adapted to flow at a rate dependent upon the viscosity of the fluid whereby to change the amplitude of the vibration of said vibratory member in accordance with changes of viscosity of the fluid, and means to make known an abnormal amplitude only of vibrations of said vibratory member.

In testimony whereof, I have signed my name to this specification.

RICHARD J. HAUG.